(12) United States Patent
Chuang

(10) Patent No.: US 8,622,553 B2
(45) Date of Patent: Jan. 7, 2014

(54) REDUCED-SPECKLE LASER PROJECTOR WITH SPECKLE-REDUCTION

(75) Inventor: Ping-Yang Chuang, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 273 days.

(21) Appl. No.: 13/070,492

(22) Filed: Mar. 24, 2011

(65) Prior Publication Data

US 2012/0099086 A1    Apr. 26, 2012

(30) Foreign Application Priority Data

Oct. 22, 2010   (TW) ............................. 99136057 A

(51) Int. Cl.
*G03B 21/14*   (2006.01)
*A47B 81/00*   (2006.01)
*G03B 17/02*   (2006.01)
*H01J 1/18*   (2006.01)
*H01J 19/12*   (2006.01)
*F16M 13/00*   (2006.01)

(52) U.S. Cl.
USPC .......... 353/119; 312/10.1; 352/242; 313/269; 248/560

(58) Field of Classification Search
USPC ................. 353/119, 122; 312/10.1; 352/242; 313/50, 269; 248/560; 356/306, 390
See application file for complete search history.

(56) References Cited

U.S. PATENT DOCUMENTS 5,304,112 A * 4/1994 Mrklas et al. ................... 600/27
7,244,032 B2 * 7/2007 Inamoto .......................... 353/94

* cited by examiner

Primary Examiner — Tony Ko
Assistant Examiner — Magda Cruz
(74) *Attorney, Agent, or Firm* — Altis Law Group, Inc.

(57) ABSTRACT

A laser projector includes a housing, a light source arranged within the housing, and a vibration module arranged within the housing to cause the light source to vibrate in a predetermined range.

5 Claims, 2 Drawing Sheets

REDUCED-SPECKLE LASER PROJECTOR WITH SPECKLE-REDUCTION

BACKGROUND

1. Technical Field

The present disclosure relates to projectors, and particularly to a laser projector having speckle-reduction function.

2. Description of Related Arts

Coherent light such as a laser, produces speckle while illuminating a rough surface. Specifically, referring to FIG. 1, reflection from the rough surface 104 is referred to as diffuse reflection. In diffuse reflection, light beams, such as two adjacent light beams 102 and 103, scatter in various directions. The coherent light scattered by diffuse reflection forms an interference pattern in the space away from the rough surface, and a dark and bright granular pattern can be seen by a human eye. The granular pattern is speckle that needs to be reduced for devices using laser projection.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present disclosure will now be described in detail below, with reference to the accompanying drawings.

Figure 1:
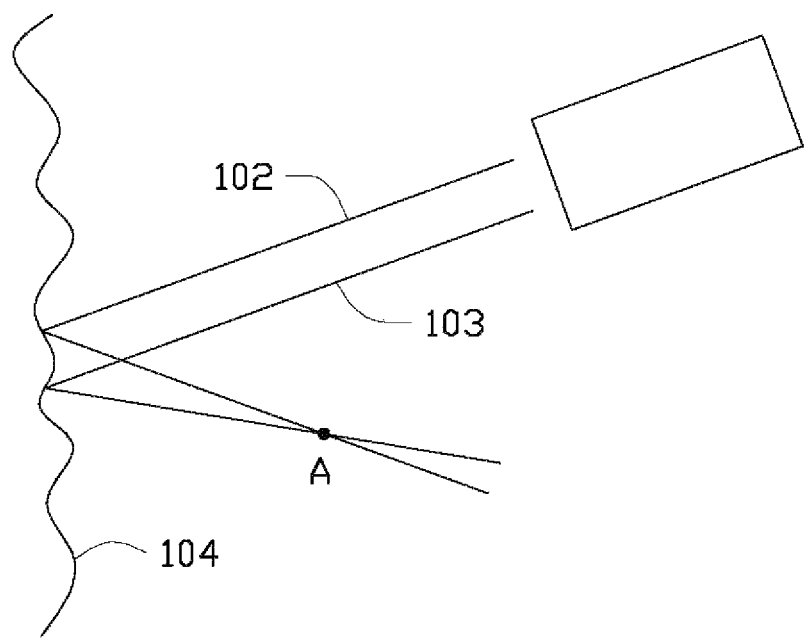
FIG. 1 is a schematic planar view showing how speckles are formed by coherent light sources, such as a laser illuminating a rough surface.
Figure 2:
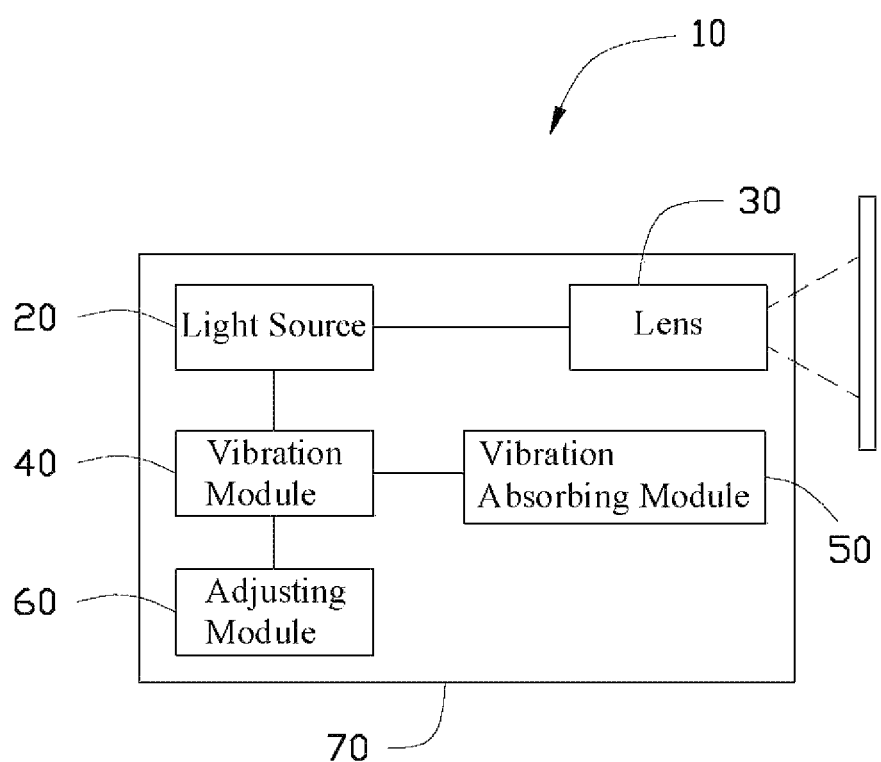
FIG. 2 is a schematic, isometric view of block diagram of a laser projector in accordance with an exemplary embodiment.

Referring to FIG. 2, a laser projector 10 includes a light source 20, a lens 30, a vibration module 40, and a housing 70. The light source 20, the lens 30, and the vibration module 40 are all arranged within the housing 70. The vibration module 40 vibrates the laser source 20. In the embodiment, the vibration module 40 can drive the laser source 20 to move in two substantially perpendicular directions. Due to the small-amplitude vibration of the laser source 20, the speckles produced by the laser source 20 moves accordingly. Because of image burn-in, what the observers see are the superimposition of the speckles. When the frequency of the vibration of the laser source 20 is set within a predetermined range, the observers feel that the speckles have disappeared. The laser source 20 can be a laser diode.

In the embodiment, the laser projector 10 further includes a vibration absorbing module 50 connected between the housing 70 and the vibration module 40. The vibration absorbing module 50 is used to absorb the vibration of housing 70 caused by the vibration module 400, thus reducing or eliminating the negative effect of the vibration module 400 to the housing 70. In the embodiment, the vibration absorbing module 50 can be a soft rubber pad or a coil spring attached to the bottom of the housing of the projector 10.

In the embodiment, the laser projector 10 further includes an adjusting module 60 to adjust the input power of the vibration module 40. The vibration amplitude of the laser source 20 can then be adjusted accordingly, thereby allowing the users to adjust the projector to obtain a better speckle reduction effect.

While various embodiments have been described and illustrated, the disclosure is not to be constructed as being limited thereto. Various modifications can be made to the embodiments by those skilled in the art without departing from the true spirit and scope of the disclosure as defined by the appended claims.

What is claimed is:

1. A laser projector comprising:
   a housing;
   a light source arranged within the housing;
   a vibration module arranged within the housing to cause the light source to vibrate in a predetermined range; and
   an adjusting module to adjust input power of the vibration module, thereby allowing a vibration amplitude of the light source to be adjusted.

2. The laser projector according to claim 1, wherein the light source is a laser diode.

3. The laser projector according to claim 1, further comprising a vibration absorbing module to absorb the vibration of the housing caused by the vibration module.

4. The laser projector according to claim 3, wherein the vibration absorbing module is a rubber pad.

5. The laser projector according to claim 3, wherein the vibration absorbing module is a coil spring.

\* \* \* \* \*